United States Patent
Meholensky et al.

(10) Patent No.: US 11,973,524 B2
(45) Date of Patent: Apr. 30, 2024

(54) SPUR DISPERSING MIXER

(71) Applicant: Rockwell Collins, Inc., Cedar Rapids, IA (US)

(72) Inventors: Michael C. Meholensky, Marion, IA (US); Robert D. Pond, Iowa City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/306,556

(22) Filed: May 3, 2021

(65) Prior Publication Data

US 2022/0352913 A1 Nov. 3, 2022

(51) Int. Cl.
| H04B 1/04 | (2006.01) |
| H04B 1/00 | (2006.01) |
| H04B 1/10 | (2006.01) |
| H04B 7/12 | (2006.01) |

(52) U.S. Cl.
CPC ......... *H04B 1/0475* (2013.01); *H04B 1/0064* (2013.01); *H04B 1/10* (2013.01); *H04B 7/12* (2013.01)

(58) Field of Classification Search
CPC ...... H04B 1/0475; H04B 1/0064; H04B 1/10; H04B 7/12; H04B 1/0483
See application file for complete search history.

(56) References Cited

U.S. PATENT DOCUMENTS

| | | | | |
|---|---|---|---|---|
| 3,740,748 A | * | 6/1973 | Hose | G01S 13/53 342/194 |
| 4,044,359 A | * | 8/1977 | Applebaum | G01S 3/06 455/314 |
| 4,263,617 A | * | 4/1981 | Chemin | H03F 1/06 348/724 |
| 4,573,051 A | * | 2/1986 | Farina | G01S 7/2813 342/158 |
| 4,715,048 A | * | 12/1987 | Masamura | H04B 7/18534 455/137 |
| 5,924,031 A | * | 7/1999 | Copeland | H04B 7/2041 455/12.1 |
| 6,161,004 A | * | 12/2000 | Galal | H03D 7/161 455/302 |

(Continued)

FOREIGN PATENT DOCUMENTS

| CN | 106612105 A | 5/2017 |
| CN | 110830064 A | 2/2020 |
| TW | I560997 B | 12/2016 |

*Primary Examiner* — Jinsong Hu
*Assistant Examiner* — Rui M Hu
(74) *Attorney, Agent, or Firm* — Suiter Swantz IP (57) ABSTRACT

A radio receiver system and a radio transmitter system are disclosed. The radio receiver system comprises a plurality of intermediate frequency (IF) shifting channels configured to shift incoming signals having a first frequency to an intermediate frequency in a first mixing stage, and to a second frequency in a second mixing stage. The radio transmitter system comprises a plurality of IF shifting channels configured to shift outgoing signals having a first frequency to an intermediate frequency in a first mixing stage, and to a second frequency in a second mixing stage. Since each intermediate frequency is different, the signals shifted to the second frequency combine by coherent addition, and any spurious signals combine by incoherent addition.

5 Claims, 8 Drawing Sheets

(56) References Cited

U.S. PATENT DOCUMENTS

| | | | |
|---|---|---|---|
| 6,195,539 B1* | 2/2001 | Galal | H03D 7/18 455/317 |
| 6,650,375 B1* | 11/2003 | Maeda | H03D 7/161 348/E7.052 |
| 7,042,960 B2 | 5/2006 | Kintis | |
| 7,613,249 B1* | 11/2009 | Tsai | H04L 25/03828 375/296 |
| 7,904,024 B2* | 3/2011 | Dessert | H04B 15/06 348/731 |
| 8,576,951 B2 | 11/2013 | Mombers et al. | |
| 9,479,232 B1* | 10/2016 | Loui | H04B 7/0617 |
| 9,520,833 B1 | 12/2016 | Wyse et al. | |
| 10,006,952 B1 | 6/2018 | Bradley | |
| 10,693,687 B1* | 6/2020 | Kushnir | H04L 27/0014 |
| 10,756,798 B2* | 8/2020 | Berg | H01Q 3/30 |
| 2002/0072346 A1* | 6/2002 | Kato | H04L 27/20 455/67.11 |
| 2003/0129955 A1* | 7/2003 | Gilmore | H03D 7/18 455/296 |
| 2003/0129959 A1* | 7/2003 | Gilmore | H04B 1/28 455/337 |
| 2005/0163038 A1* | 7/2005 | Anvari | H04L 27/2623 370/203 |
| 2005/0185723 A1* | 8/2005 | Anvari | H04L 27/2614 375/260 |
| 2006/0025099 A1* | 2/2006 | Jung | H03D 7/166 455/313 |
| 2006/0105715 A1* | 5/2006 | Kodani | H03F 1/3247 455/63.1 |
| 2007/0155348 A1* | 7/2007 | Razavi | H04B 1/719 455/112 |
| 2008/0080631 A1* | 4/2008 | Forenza | H04B 7/0684 375/260 |
| 2009/0286499 A1* | 11/2009 | Marath | H04B 1/109 455/311 |
| 2011/0124301 A1* | 5/2011 | Prasidh | G01R 33/3692 455/110 |
| 2011/0216810 A1* | 9/2011 | Kumar | H04B 1/0483 375/147 |
| 2012/0302193 A1* | 11/2012 | Seendripu | H03H 11/22 455/314 |
| 2014/0273814 A1 | 9/2014 | Ralph et al. | |
| 2019/0245598 A1* | 8/2019 | Berg | H01Q 3/30 |
| 2021/0067187 A1 | 3/2021 | Beamish et al. | |

* cited by examiner

SPUR DISPERSING MIXER

SUMMARY

A radio receiver system is disclosed in accordance with one or more illustrative embodiments of the present disclosure. In one illustrative embodiment, the radio receiver system comprises one or more receiving antenna elements configured to receive incoming signals having a first frequency. In another illustrative embodiment, the radio receiver system comprises a plurality of intermediate frequency (IF) shifting channels, each configured to receive a respective one of the incoming signals having the first frequency. Each of the plurality of IF shifting channels comprises: a first mixing stage configured to shift the respective one of the incoming signals to a respective one of IF signals having an intermediate frequency; and a second mixing stage configured to shift the respective one of the IF signals to a respective one of incoming signals having a second frequency. The intermediate frequency of each respective one of the IF signals is different from the intermediate frequencies of others of the IF signals. The first frequency and the second frequency are different.

A radio transmitter system is disclosed in accordance with one or more illustrative embodiments of the present disclosure. In one illustrative embodiment, the radio transmitter system comprises a plurality of intermediate frequency (IF) shifting channels, each configured to receive a respective one of outgoing signals having a first frequency. Each of the plurality of IF shifting channels comprises: a first mixing stage configured to shift the respective one of the outgoing signals to a respective one of IF signals having a respective intermediate frequency; and a second mixing stage configured to shift the respective one of the IF signals to a respective one of outgoing signals having a second frequency. In another illustrative embodiment, the radio transmitter system comprises one or more transmitting antenna elements configured to transmit the outgoing signals having the second frequency. The intermediate frequency of each respective one of the IF signals is different from the intermediate frequencies of others of the IF signals. The first frequency and the second frequency are different.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

High frequency radio frequency (RF) systems traditionally generate signals at lower frequencies, and then shift the carrier frequency of the signal to the appropriate frequency band. The operation of frequency conversation (e.g., as part of a super heterodyne system) can happen in several different circuit elements, including frequency mixers. Frequency mixers are inherently non-linear devices, and as such can produce unwanted signals when generating a signal of interest. The unwanted signals are also called or spurious emissions or spurious signals ("spurs"). Spurious signals can cause problems in receiving signals by blocking or interfering. Additionally, spurious signals that are transmitted are governed by the Federal Communications Commission (FCC).

Traditional techniques to avoid spur generation involve complicated mixing schemes to push spurs far out of the band of interest requiring expensive advanced mixer topologies and specialized fabrication components. The spurious signals must then be filtered with cascaded filters, increasing power loss in the signal of interest and increasing the size and cost of the RF system. Therefore, it is desirable to reduce or avoid spurious signal transmission and reception while avoiding the aforementioned problems.

Embodiments of the present disclosure are directed radio transmitter systems and radio receiver systems that advantageously disperse spurs without expensive, high-performance parts. To this end, the present systems include a plurality of intermediate frequency (IF) shifting channels (e.g., heterodyning subsystems), each including a first mixing stage and a second mixing stage. Signals (e.g., incoming signals for a receiver and outgoing signals for a transmitter) may be shifted to an intermediate frequency at the first mixing stage, and then to a second frequency (e.g., target frequency) at the second mixing stage. Signals output by the second mixing stages at the second frequency (e.g., signals of interest) may be combined using a summing circuit, or may be combined in space as electromagnetic waves (e.g., when transmitted from a electronically scanned array). This combination causes the signals of interest having the second frequency to constructively interfere by coherent addition, and causes the spurious signals to disperse by incoherent addition.

Figure 1A:
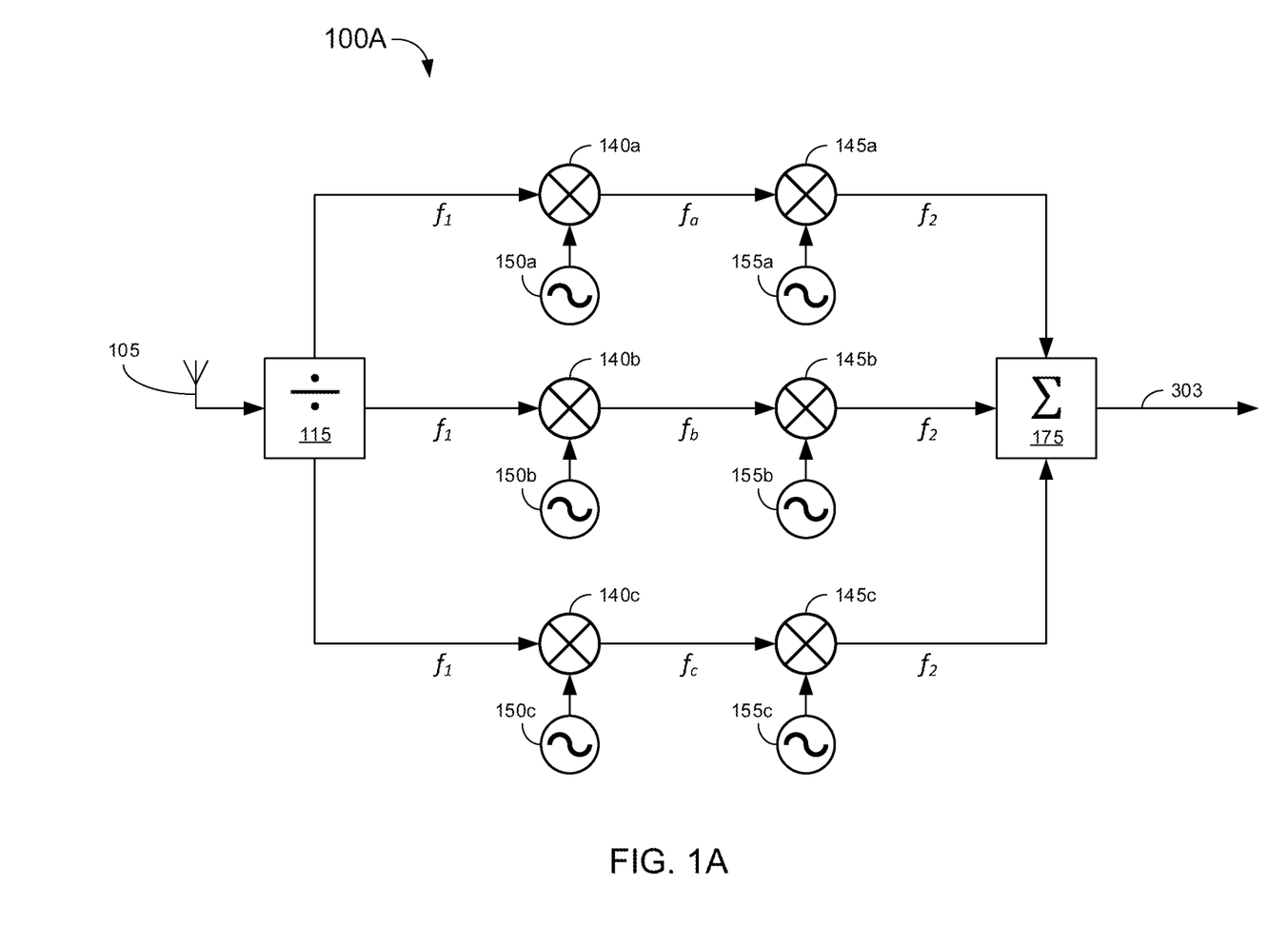
FIGS. 1A and 1B are diagrams of radio receiver systems, in accordance with one or more embodiments of the present disclosure.

FIG. 1A is a diagram view of a radio receiver system 100A, in accordance with one or more embodiments of the present disclosure. The radio receiver system 100 may include a receiving antenna element 105 configured to receive an incoming radio signal having a first frequency $f_1$ from a remote source (e.g., satellites, other aircraft, ground stations, etc.). A splitter 115 (e.g., power divider) may be configured to split the incoming signal into a plurality of incoming signals having the first frequency Although three incoming signals are shown in FIG. 1A, the present disclosure is not limited thereto.

The system 100A may include a plurality of IF shifting channels (e.g., heterodyning subsystems). Although three IF shifting channels are shown in FIG. 1A, the present disclosure is not limited thereto. For example, the system 100A may include n IF shifting channels, where n is an integer greater than one.

A first IF shifting channel may include a first mixing stage including a mixer 140a and a local oscillator 150a, and a second mixing stage including a mixer 145a and a local oscillator 155a. A second IF shifting channel may include a first mixing stage including a mixer 140b and a local oscillator 150b, and a second mixing stage including a mixer 145b and a local oscillator 155b. A third IF shifting channel may include a first mixing stage including a mixer 140c and a local oscillator 150c, and a second mixing stage including a mixer 145c and a local oscillator 155c.

The first mixing stage of each IF shifting channel is configured to shift the respective incoming signal having the frequency $f_1$ to a respective IF signal having an intermediate frequency. For example, the first mixing stage of the first IF shifting channel shifts the respective incoming signal to a frequency $f_a$, the first mixing stage of the second IF shifting channel shifts the respective incoming signal to a frequency $f_b$, and the first mixing stage of the third IF shifting channel shifts the respective incoming signal to a frequency $f_c$. It is noted that the frequency $f_a$, the frequency $f_b$, and the frequency $f_c$ may be different from each other (i.e., have substantially different frequencies). Since the IF signals generated at the first mixing stages have different frequencies, the spurious signals generated at the first mixing stages and the second mixing stages also have different frequencies from each other. The spurious signals generated by the mixer 140a may be different from the spurious signals generated by the mixer 140b and the spurious signals generated by the mixer 140c. Likewise, the spurious signals generated by mixer 140b may be different from the spurious signals generated by the mixer 140c.

The second mixing stage of each IF shifting channel is configured to shift each respective IF signal having the intermediate frequency $f_a$, $f_b$, or $f_c$ to a respective incoming signal having the second frequency $f_2$. The incoming signals may then be combined using a summing circuit 175 (e.g., a power combiner) into a single incoming signal 303 having the frequency $f_2$ (a signal of interest having a target frequency). Since each path uses different mixing frequencies $f_a$, $f_b$, or $f_c$, but the final translation is to the same frequency $f_2$, spurs generated in each of the separate paths do not add coherently (e.g., incoherent addition) and have amplitudes that are substantially lower than the signal of interest. In contrast, the incoming signals may add coherently (e.g., constructively interfere) when combined into the incoming signal 303. Since the spurs are generated at non-coherent frequencies, extra filtering may not be required to remove the spurs.

Figure 1B:
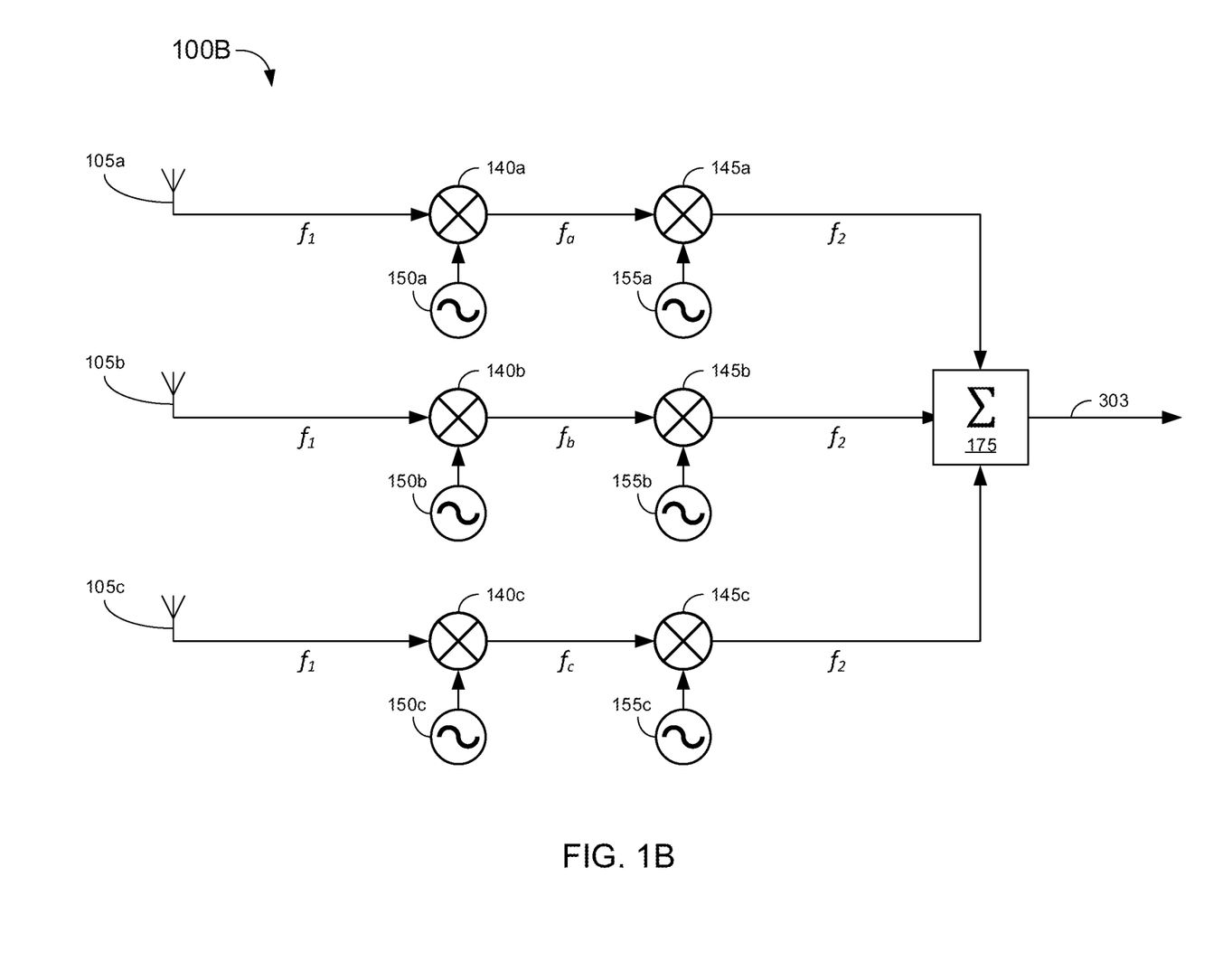

FIG. 1B is a diagram view of a radio receiver system 100B, in accordance with one or more embodiments of the present disclosure. The components of the radio receiver system 100B may be substantially similar or substantially identical to the similarly named components of the system 100A described with respect to FIG. 1A. However, in this embodiment, a plurality of antenna elements 105a-c (instead of a single antenna element 105) may be a part of an active electronically scanned array (ESA). Since each antenna element 105a-c is coupled to a different IF shifting channel and receives a separate incoming signal having the frequency $f_1$, a splitter (e.g., splitter 115) may not be required.

Figure 2A:
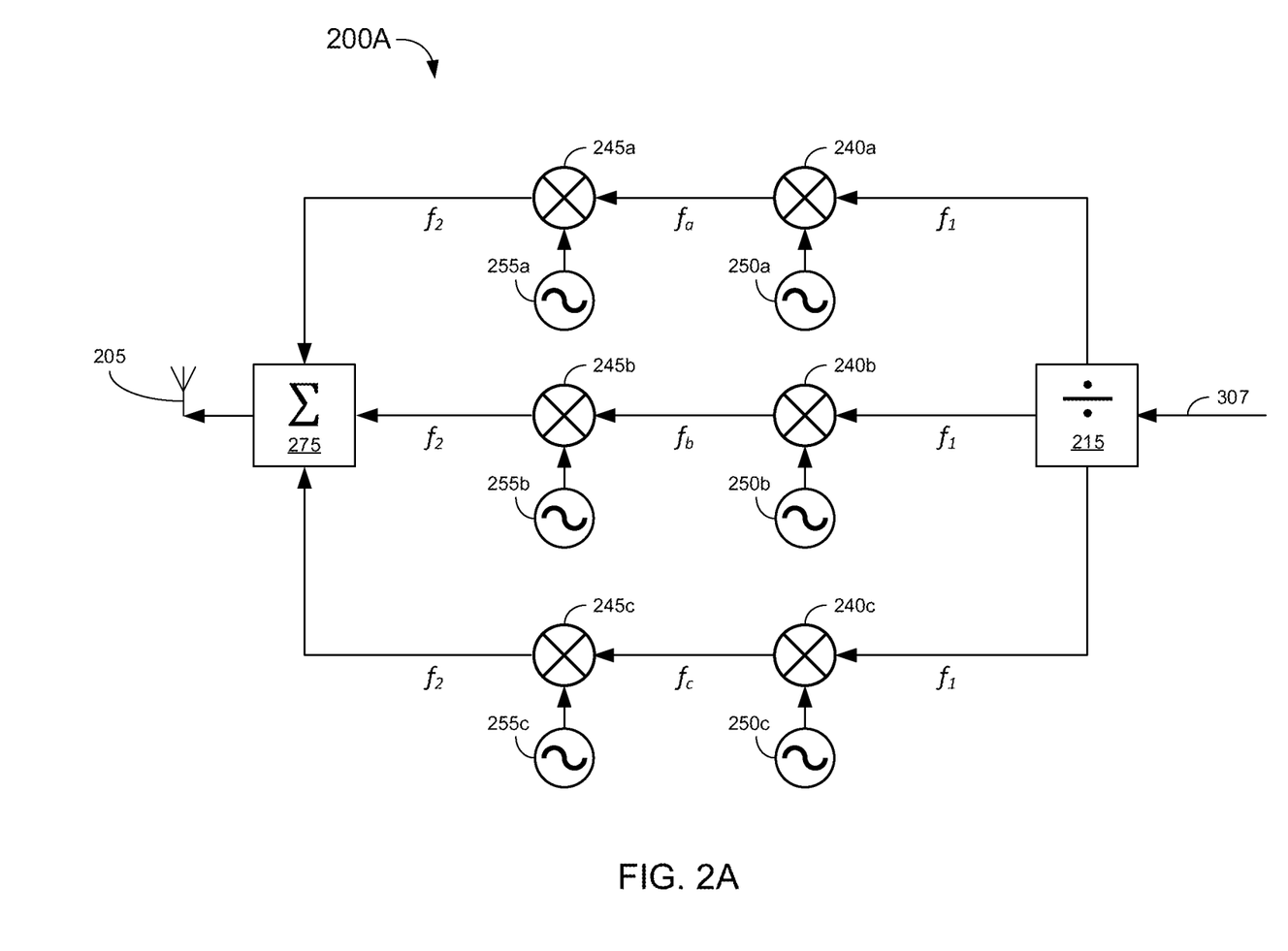
FIGS. 2A and 2B are diagrams of radio transmitter systems, in accordance with one or more embodiments of the present disclosure.

FIG. 2A is a diagram view of a radio transmitter system 200A, in accordance with one or more embodiments of the present disclosure. A splitter 215 (e.g., power divider) may be configured to split an outgoing signal having a first frequency $f_1$ into a plurality of outgoing signals having the first frequency $f_1$. Although three outgoing signals are shown in FIG. 2A, the present disclosure is not limited thereto.

The system 200A may include a plurality of IF shifting channels (e.g., heterodyning subsystems). Although three IF shifting channels are shown in FIG. 2A, the present disclosure is not limited thereto. A first IF shifting channel may include a first mixing stage including a mixer 240a and a local oscillator 250a, and a second mixing stage including a mixer 245a and a local oscillator 255a. A second IF shifting channel may include a first mixing stage including a mixer 240b and a local oscillator 250b, and a second mixing stage including a mixer 245b and a local oscillator 255b. A third IF shifting channel may include a first mixing stage including a mixer 240c and a local oscillator 250c, and a second mixing stage including a mixer 245c and a local oscillator 255c.

The first mixing stage of each IF shifting channel is configured to shift the respective outgoing signal having the frequency $f_1$ to a respective IF signal having an intermediate frequency. For example, the first mixing stage of the first IF shifting channel shifts the respective outgoing signal to a frequency $f_a$, the first mixing stage of the second IF shifting channel shifts the respective outgoing signal to a frequency $f_b$, and the first mixing stage of the third IF shifting channel shifts the respective outgoing signal to a frequency $f_c$. It is noted that the frequency $f_a$, the frequency $f_b$, and the frequency $f_c$ may be different from each other (i.e., have substantially different frequencies). Since the IF signals generated at the first mixing stages have different frequencies, the spurious signals generated at the first mixing stages and the second mixing stages also have different frequencies from each other. The spurious signals generated by the mixer 240a may be different from the spurious signals generated by the mixer 240b and the spurious signals generated by the mixer 240c. Likewise, the spurious signals generated by mixer 240b may be different from the spurious signals generated by the mixer 240c.

The second mixing stage of each IF shifting channel is configured to shift each respective IF signal having the intermediate frequency $f_a$, $f_b$, or $f_c$ to a respective outgoing signal having the second frequency $f_2$. The outgoing signals may then be combined using a summing circuit 275 (e.g., a power combiner) into a single outgoing signal having the frequency $f_2$ (a signal of interest having a target frequency). The single outgoing signal may then be transmitted from the transmitting antenna element 205 to a remote source (e.g., satellites, other aircraft, ground stations, etc.).

Since each path uses different mixing frequencies $f_a$, $f_b$, or $f_c$, but the final translation is to the same frequency $f_2$, spurs generated in each of the separate paths disperse since the spurs do not add coherently (e.g., incoherent addition) and have amplitudes that are substantially lower than the signal of interest. In contrast, the outgoing signals may add coherently (e.g., constructively interfere) when combined into the single outgoing signal. Since the spurs are generated at non-coherent frequencies, extra filtering may not be required to remove the spurs at the outputs of the second mixing stages and/or the summing circuit 275.

Figure 2B:
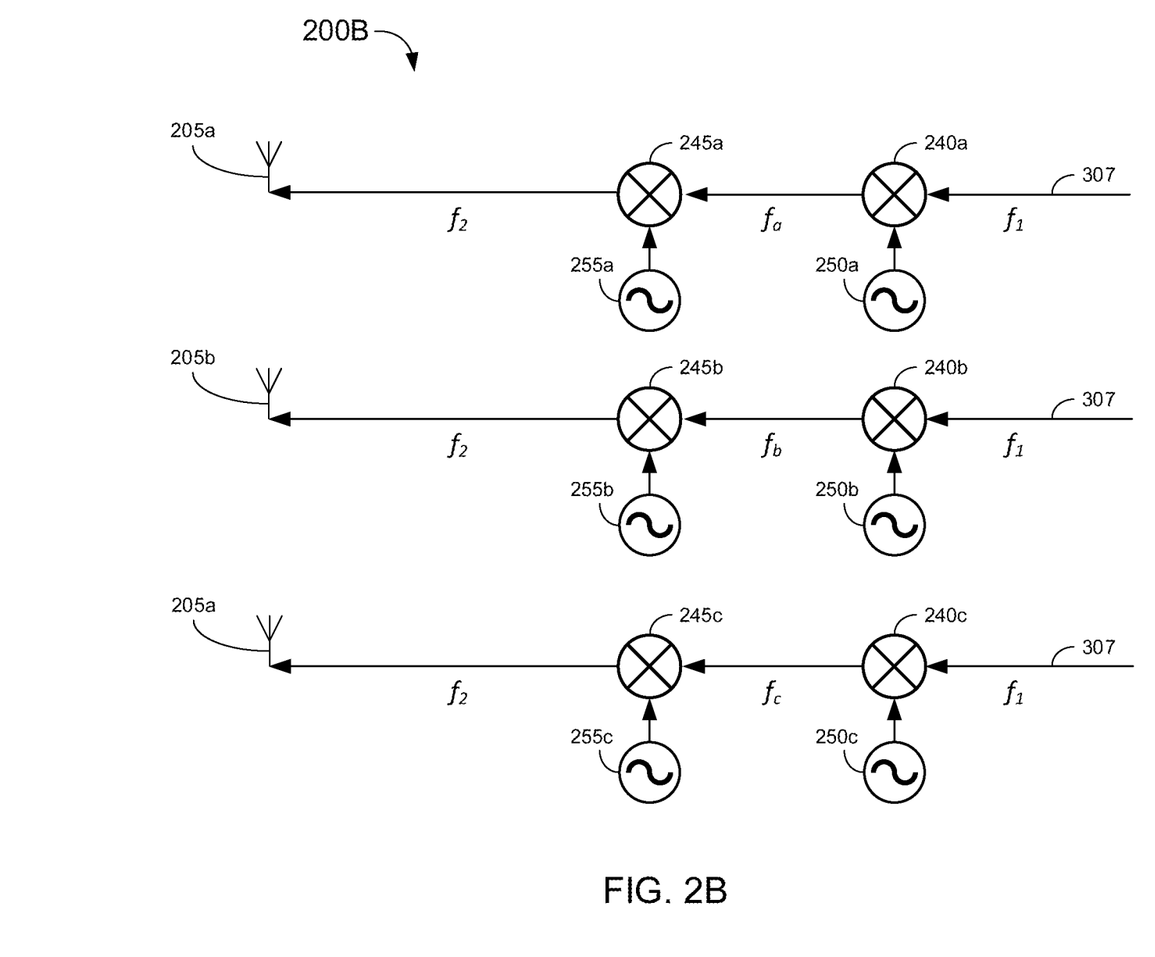

FIG. 2B is a diagram view of a radio transmitter system 200B, in accordance with one or more embodiments of the present disclosure. The components of the radio transmitter system 200B may be substantially similar or substantially identical to the similarly named components of the system 200A described with respect to FIG. 2A. However, in this embodiment, a plurality of antenna elements 205a-c (instead of a single antenna element 205) may be a part of an active electronically scanned array (ESA). Each transmitting antenna element 105a-c is coupled to a different IF shifting channel and transmits a separate outgoing signal having the frequency $f_2$. The outgoing signals output by the ESA may add coherently (e.g., constructively interfere) when combined to form a beam in space (e.g., as electromagnetic waves). Therefore, it may not be required to use the summing circuit 275 to achieve coherent addition of the outgoing signals and incoherent addition of spurious signals.

Figure 3A:
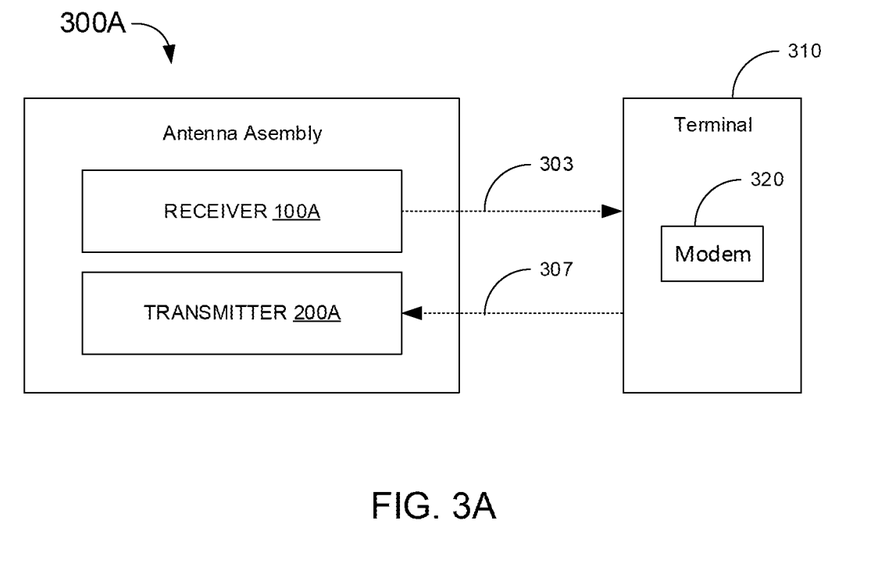
FIGS. 3A and 3B are diagrams of antenna assemblies including a receiver and a transmitter, in accordance with one or more embodiments of the present disclosure.

FIG. 3A is a diagram view of an antenna assembly 300A including the receiver system 100A and the transmitter system 200A. A terminal 310 may be communicatively coupled to the receiver 100A and transmitter 200A. The terminal 310 may be powered via a power input and may be coupled to an I/O bus to enable control and data signals to be communicated between the terminal 310 and the antenna assembly 300A. The terminal 310 may receive signals 303 using a receive line coupled between the terminal 310 and the antenna assembly 300A. The terminal 310 may transmit signals 307 using a transmit line coupled between the terminal 310 and the antenna assembly 300A. The RF signals may be IF signals or baseband signals. The signals 307 may be modulated (e.g., encoded with information) by a modem 320 and the signals 303 may be demodulated (e.g., decoded to extract information) by the modem 320. In some embodiments, a multiplexer may be used to combine signals having different frequencies onto a single line (e.g., the transmit line or the receive line), and a demultiplexer may be used to separate signals having different frequencies on the same line into separate lines.

The antenna assembly 300A may be disposed on an aircraft at various locations. In some embodiments, the antenna assembly 300A may be disposed outside of the fuselage of an aircraft for transmitting and receiving RF signals to and from satellite networks. In some embodiments, the antenna assembly 300A is disposed on a top portion of the aircraft. In some embodiments, the antenna assembly 300a is located outside the pressure vessel of the aircraft, and the terminal 310 is located inside the pressure vessel of the aircraft. Although the antenna assembly 300A may be disposed on an aircraft, it is noted that the embodiments of the present disclosure described herein may be a part of a terrestrial vehicle, marine vehicle, stationary system, etc.

Figure 3B:
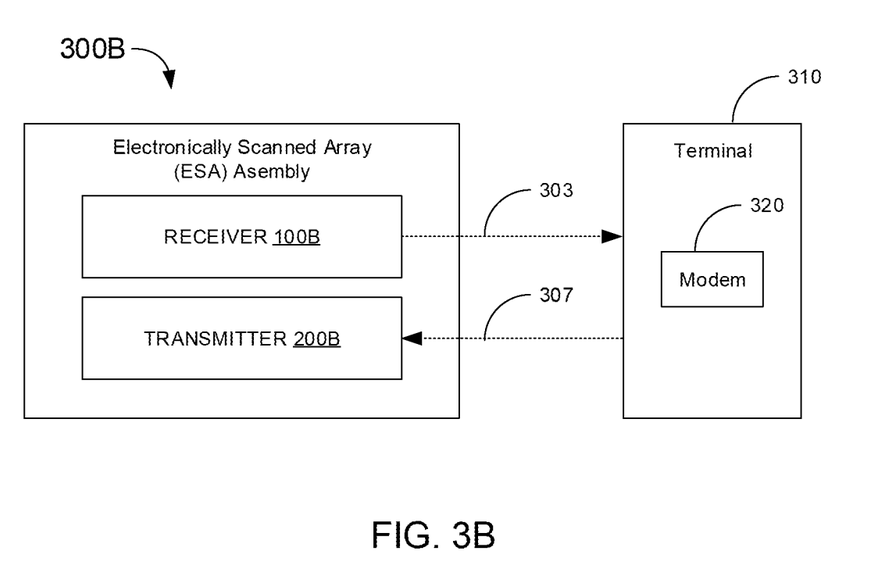

FIG. 3B is a diagram view of an antenna assembly 300B including the receiver system 100B and the transmitter system 200B. The antenna assembly 300B may be substantially similar or substantially identical to the similarly named components of the antenna assembly 300A. However, the receiver system 100B and the transmitter system 200B may each include an active electronically scanned array (ESA).

Figure 4:
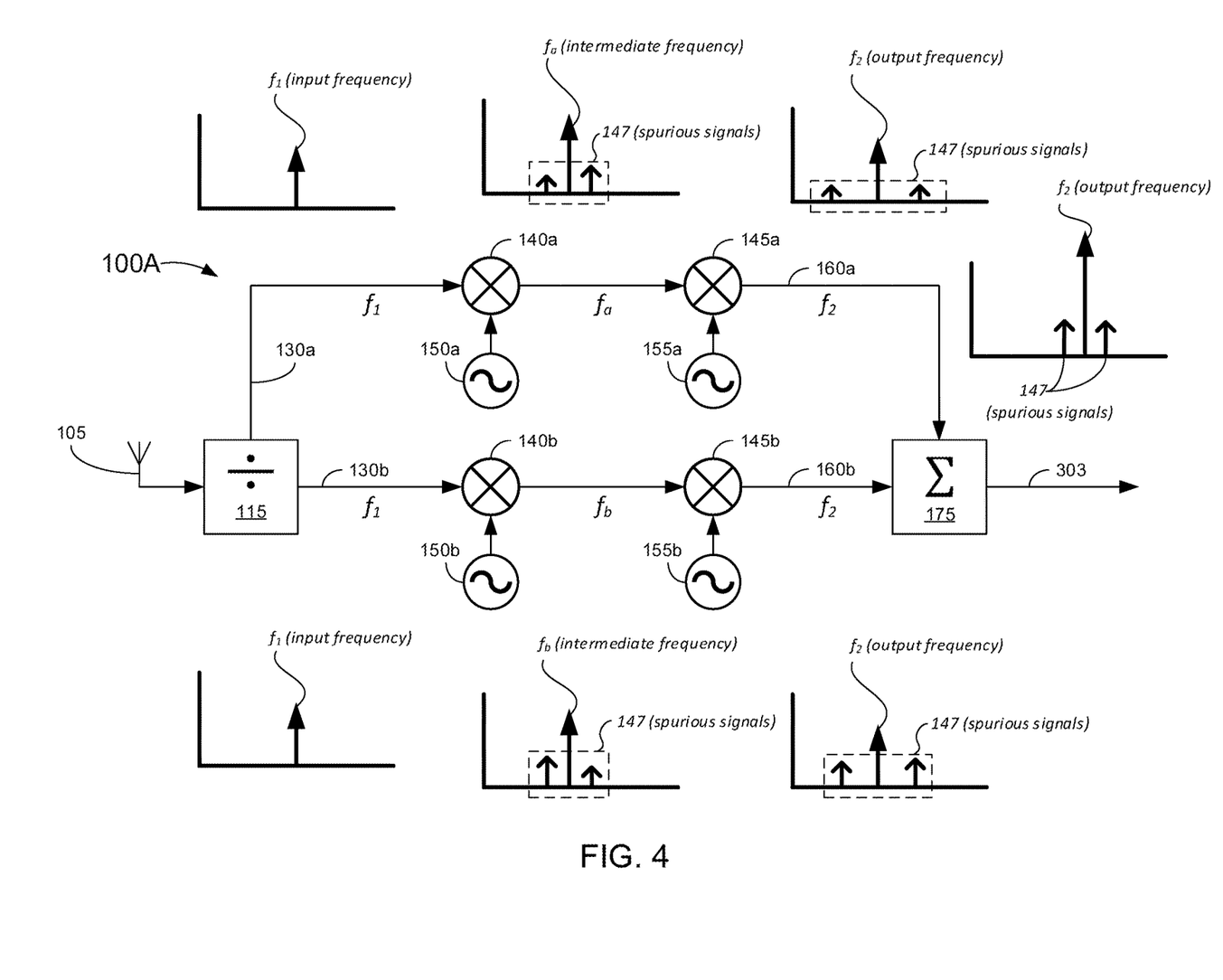
FIG. 4 is a diagram illustrating the combination of spurious signals by incoherent addition, in accordance with one or more embodiments of the present disclosure.

FIG. 4 is a diagram illustrating the concept of the combination of spurious signals by incoherent addition, in accordance with one or more embodiments of the present disclosure. In particular, the first and second IF shifting channels of the receiver system 100A are shown. Surrounding the circuit diagram are conceptual graphs with the horizontal axis representing frequency and the vertical axis representing amplitude. The conceptual graphs illustrate the signals present at each stage of frequency conversion.

As shown, the input frequencies $f_1$ of the incoming signals 130a and 130b are equivalent. Since the intermediate frequencies $f_a$ and $f_b$ are different from each other, the spectrums of spurious signals 147 generated at the first mixing stage are different from each other. Likewise, the spectrums of spurious signals 147 generated at the second mixing stage are also different from each other. As shown in the conceptual graph on the far right of FIG. 4, the output spurs add incoherently and are therefore dispersed, while the outgoing signals 160a and 160b having the frequency $f_2$ add coherently and are therefore preserved.

Figure 5:
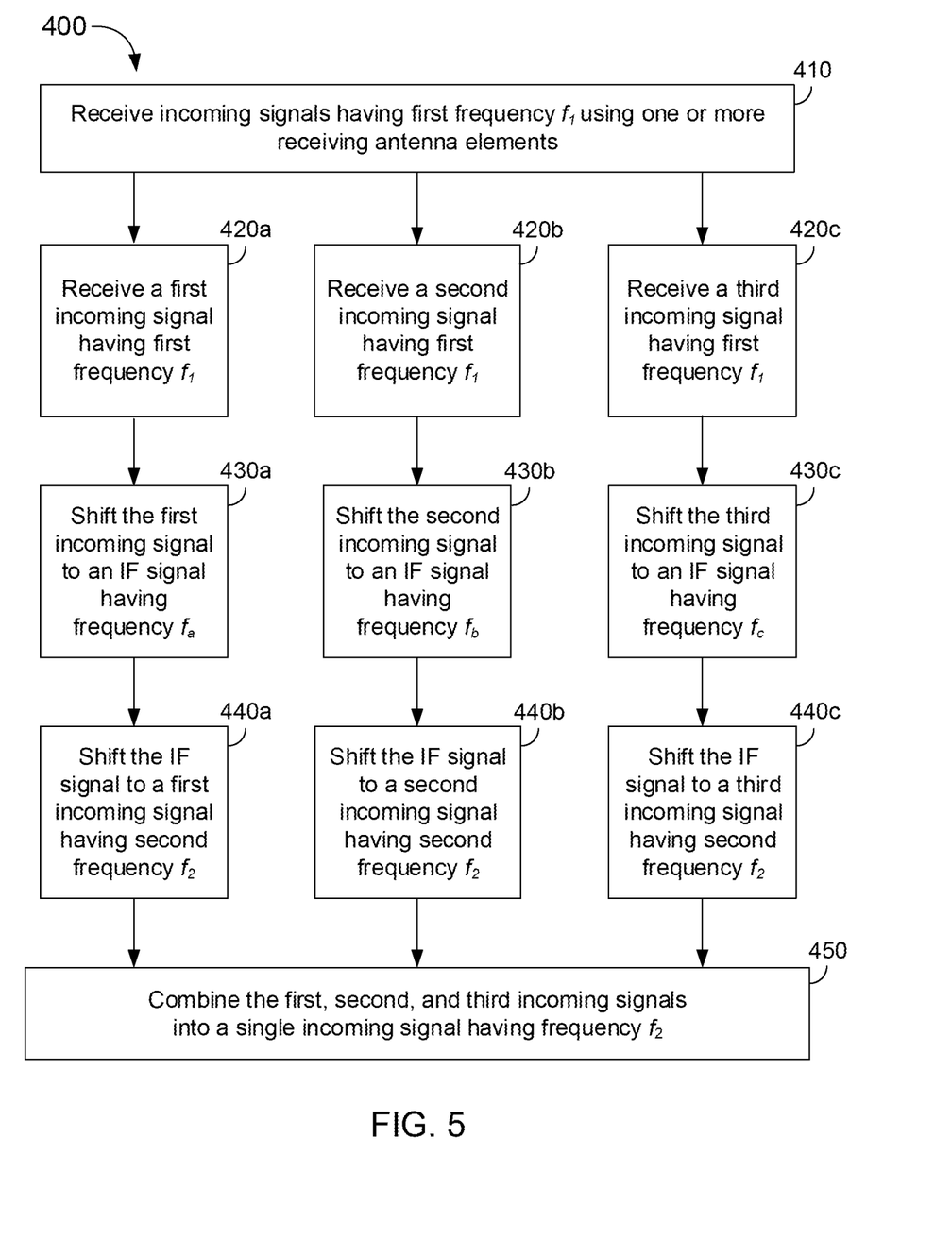
FIG. 5 is a flowchart showing a method of receiving incoming signals, in accordance with one or more embodiments of the present disclosure.

FIG. 5 is a flowchart 400 illustrating a method of dispersing spurious signals from the output of a radio receiver system, in accordance with one or more embodiments of the present disclosure.

At step 410, incoming signals having a first frequency $f_1$ may be received using one or more receiving antenna elements. At each step 420a-c, the incoming signals may be received at respective IF shifting channels. At each step 430a-c, the respective incoming signal may be shifted to the appropriate intermediate frequency (e.g., $f_a$, $f_b$, $f_c$) at a first mixing stage. At each step 440a-c, the respective IF signal may be shifted to a respective incoming signal having a second frequency $f_2$. At step 450, the respective incoming signals may be combined into a single incoming signal. The incoming signals having the frequency $f_2$ may add coherently to a signal of interest having the frequency $f_2$, and spurious signals may add incoherently and therefore disperse.

Figure 6:
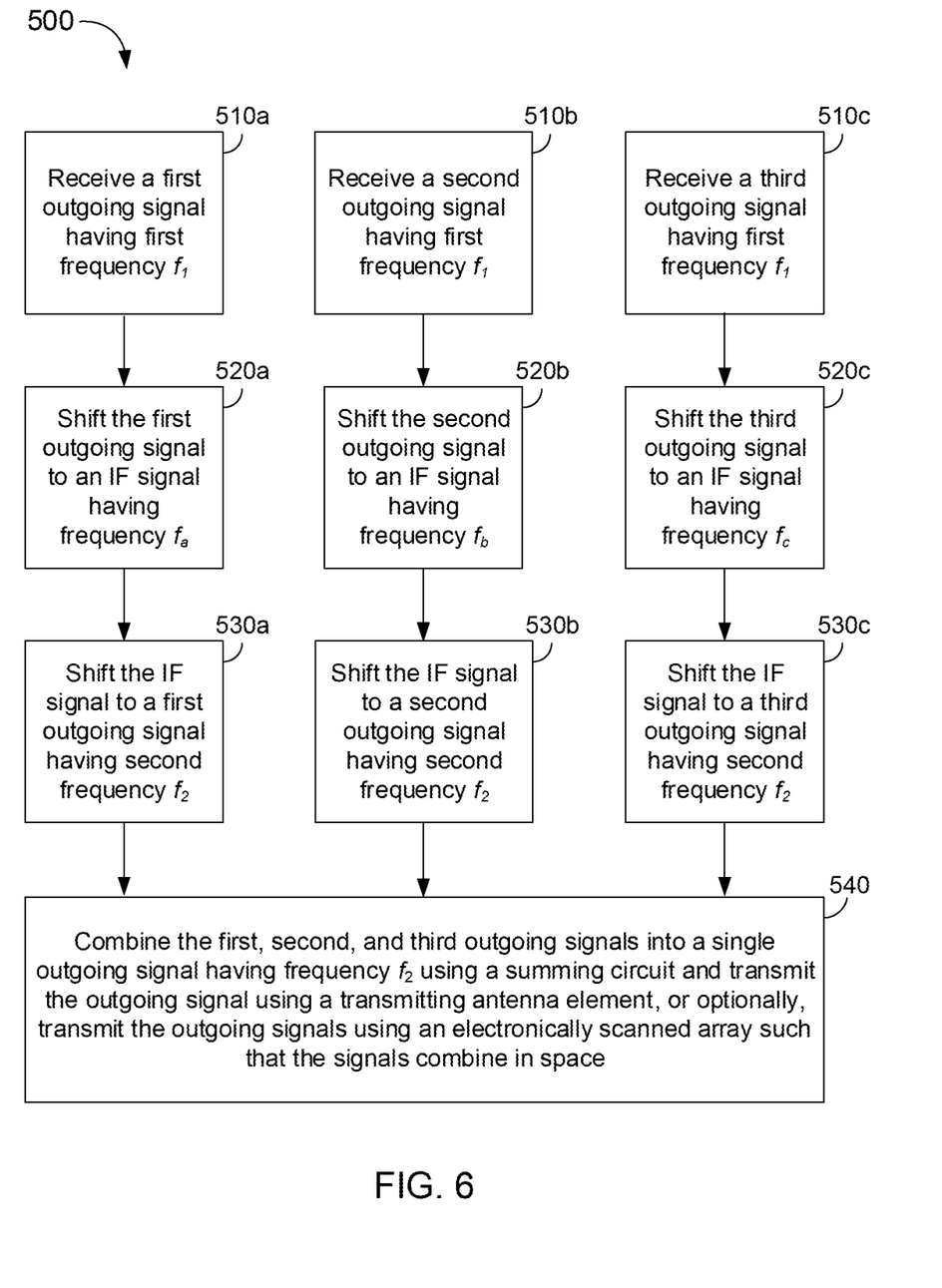
FIG. 6 is a flowchart showing a method of transmitting outgoing signals, in accordance with one or more embodiments of the present disclosure.

FIG. 6 is a flowchart 500 illustrating a method of dispersing spurious signals from the output of a radio transmitter system, in accordance with one or more embodiments of the present disclosure.

At each step 510a-c, outgoing signals having a first frequency $f_1$ may be received at respective IF shifting channels. At each step 520a-c, the respective outgoing signal may be shifted to the appropriate intermediate frequency (e.g., $f_a$, $f_b$, $f_c$) at a first mixing stage. At each step 530a-c, the respective IF signal may be shifted to a respective outgoing signal having a second frequency $f_2$. At step 540, the respective outgoing signals may be combined into a single outgoing signal (e.g., using a summing circuit). The outgoing signals having the frequency $f_2$ may add coherently to a signal of interest having the frequency $f_2$, and spurious signals may add incoherently and therefore disperse. The single outgoing signal having the frequency $f_2$ may then be transmitted by one or more transmitting antenna elements. Alternatively, if a summing circuit is not used, the outgoing signals $f_2$ may be output by an ESA, and may add coherently into the signal of interest having the frequency $f_2$ in space (for example, by creating the steered beam of the ESA using a plurality of phase shifters controlled by a controller or computer).

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed is:

1. A radio transmitter system, comprising:
a splitter, wherein the splitter splits an outgoing signal having a first frequency into a plurality of outgoing signals having the first frequency;
a plurality of intermediate frequency (IF) shifting channels, each configured to receive a respective one of the outgoing signals having the first frequency, wherein each of the plurality of IF shifting channels comprises:
a first mixing stage configured to shift the respective one of the outgoing signals to a respective one of IF signals having a respective intermediate frequency, wherein the first mixing stage of each of the IF shifting channels includes a first local oscillator and a first mixer;
a second mixing stage configured to shift the respective one of the IF signals to a respective one of outgoing signals having a second frequency, wherein the second mixing stage of each of the IF shifting channels includes a second local oscillator and a second mixer; and
one or more transmitting antenna elements configured to transmit the outgoing signals having the second frequency,
wherein a higher intermediate frequency of a first IF shifting channel is higher than a lower intermediate frequency of a second IF shifting channel, wherein each intermediate frequency of each of the plurality of IF shifting channels is a different frequency value, wherein the first local oscillator of the first channel is configured for the higher intermediate frequency and the first local oscillator of the second channel is configured for the lower intermediate frequency,
wherein the first frequency and the second frequency are different,
wherein the outgoing signals having the second frequency of each of the IF shifting channels are equivalent in frequency values such that the outgoing signals having the second frequency are configured to combine by coherent addition, wherein spurious signals are configured to combine by incoherent addition,
wherein the first local oscillator and the first mixer are configured to shift the respective one of the outgoing signals to the respective one of the IF signals having the respective intermediate frequency,
wherein the second local oscillator and the second mixer are configured to shift the respective one of the IF signals to the respective one of the outgoing signals having the second frequency.

2. The radio transmitter system of claim 1, comprising:
a summing circuit configured to combine the outgoing signals into a single outgoing signal having the second frequency,
wherein the one or more transmitting antenna elements comprises a single transmitting antenna element,
wherein the single outgoing signal is output by the single transmitting antenna element.

3. The radio transmitter system of claim 2, wherein the summing circuit combines the outgoing signals having the second frequency by coherent addition, wherein spurious signals combine by incoherent addition.

4. The radio transmitter system of claim 1,
wherein the one or more transmitting antenna elements comprise a plurality of transmitting antenna elements,
wherein an electronically scanned array (ESA) includes the plurality of transmitting antenna elements.

5. The radio transmitter system of claim 4, wherein the outgoing signals having the second frequency transmitted by the ESA combine by coherent addition in space, wherein spurious signals transmitted by the ESA combine by incoherent addition in space.

* * * * *